(12) United States Patent
Martick

(10) Patent No.: US 9,195,704 B2
(45) Date of Patent: Nov. 24, 2015

(54) AUTOMATED LOGGING FOR OBJECT-ORIENTED ENVIRONMENTS

(71) Applicant: Christian Martick, Berlin (DE)

(72) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 14/195,640

(22) Filed: Mar. 3, 2014

(65) Prior Publication Data

US 2015/0248453 A1 Sep. 3, 2015

(51) Int. Cl.
*G06F 13/00* (2006.01)
*G06F 17/30* (2006.01)

(52) U.S. Cl.
CPC .... *G06F 17/30386* (2013.01); *G06F 17/30312* (2013.01)

(58) Field of Classification Search
CPC .................................. G06F 9/465; G06F 9/547
USPC ................................................... 719/316, 330
See application file for complete search history.

(56) References Cited

U.S. PATENT DOCUMENTS

| 7,472,401 | B2 * | 12/2008 | Luo ....................... G06F 9/4433 717/108 |
| 2007/0199000 | A1 * | 8/2007 | Shekhel ................... G06F 21/53 719/330 |
| 2015/0199399 | A1 * | 7/2015 | Schroetel .......... G06F 17/30395 707/767 |

* cited by examiner

*Primary Examiner* — Andy Ho
(74) *Attorney, Agent, or Firm* — Schwegman Lundberg & Woessner, P.A.

(57) ABSTRACT

Example systems and methods of logging information in an object-oriented system are presented. In one example, a first object including a plurality of first methods is received. The first object also includes an additional method to receive an identity of one of the first methods and to return metadata corresponding to the one of the first methods. A wrapper object is created for the first object and includes a plurality of second methods. Each second method includes an interface that is equivalent to an interface of a corresponding first method. Each of the second methods is configured to call the additional method of the first object to retrieve the metadata for the corresponding first method, call the corresponding first method, receive a return value from the corresponding first method, return the return value, and store information regarding the corresponding first method based on the retrieved metadata.

20 Claims, 12 Drawing Sheets

AUTOMATED LOGGING FOR OBJECT-ORIENTED ENVIRONMENTS

FIELD

This application relates generally to data processing and, in an example embodiment, to automated logging for object-oriented environments.

BACKGROUND

As modern software systems grow in size and complexity, due primarily to continually increasing demands placed upon such systems, the ability to track and monitor execution of the system for failure and performance analysis, as well as for other related purposes, becomes increasingly important, particularly in the realm of business software systems. Consequently, most current software systems employ some type of logging mechanism or facility that provides information concerning, for example, which methods or functions have been executed, the input and output data for these functions or methods, and error or exception conditions that resulted from execution.

Typically, to provide a logging mechanism, additional program instructions, data structures, and the like may be inserted into the software methods of interest to capture the function or method calls, the method-associated input and output data, error conditions, and so on that are used to track or monitor program execution. Oftentimes, the various members of the software design team are responsible for writing and debugging these additional instructions and data structures, typically concentrating on the particular functional code modules that they have developed. At times, building logging code in this manner may lead to redundancy of effort and cost, and possibly an attendant decrease in code developer productivity.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1A:
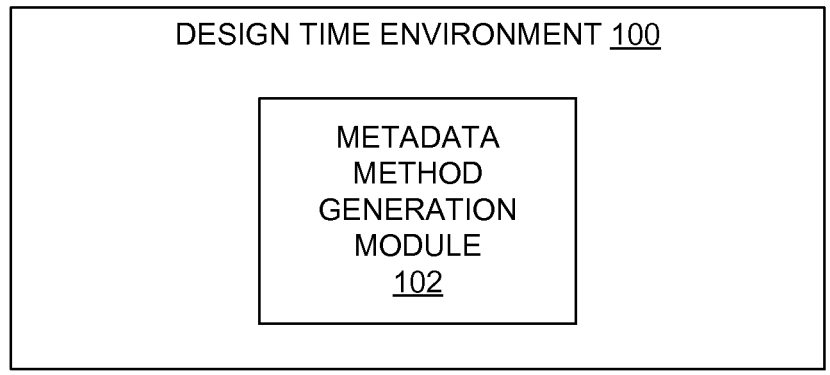
FIG. 1A is a block diagram of an example design time environment of an object-oriented system configured to facilitate automated logging.

FIG. 1A is a block diagram of an example object-oriented design time environment 100 of an object-oriented software system configured to facilitate automated logging. Examples of the object-oriented software system may be any software program, application, or other system that employs an object-oriented language or employs object-oriented principles in some fashion. Examples of object-oriented languages include, but are not limited to, C++, Java® by Oracle® Corporation, and Advanced Business Application Programming (ABAP®) Language by SAP AG.

In one example, the design time environment 100 includes a metadata method generation module 102. In one example, the metadata method generation module 102 may generate at least one additional method for each class or object for which logging is to occur. The operation of the metadata method generation module 102 is described in greater detail below in conjunction with FIGS. 2-4. Other modules of the design time environment 100 not shown in FIG. 1A may include, for example, a source code editor, build automation tools, a version control system, a compiler, and so on. In some examples, these modules may be provided in an integrated development environment (IDE). Each of these modules may be implemented in hardware or some combination of hardware and software. The design time environment 100 may also include other modules not explicitly depicted in FIG. 1A or mentioned above. In some examples, the metadata method generation module 102, as well as any other module described herein, may be combined with other modules, or may be separated into a greater number of modules.

Figure 1B:
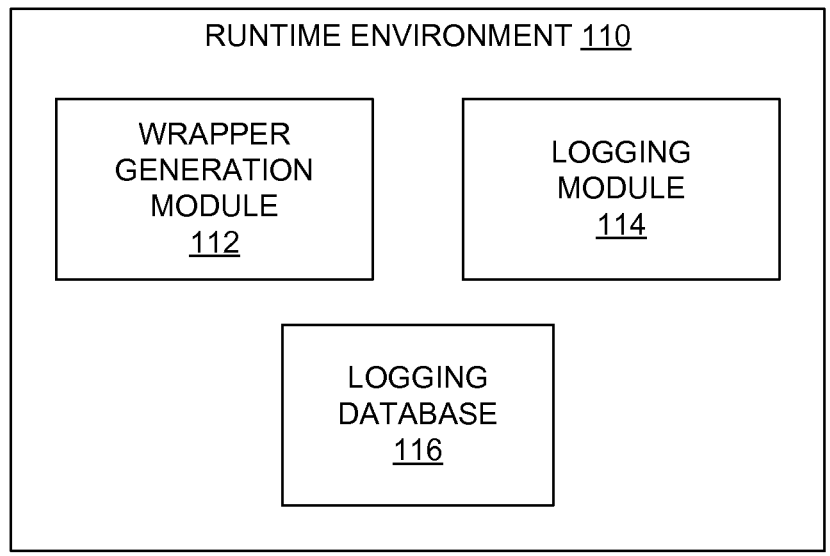
FIG. 1B is a block diagram of an example runtime environment of an object-oriented system configured to facilitate automated logging.

In conjunction with the design time environment 100 of FIG. 1A, FIG. 1B is a block diagram of an example runtime environment 110 of the object-oriented system configured to facilitate automated logging. The runtime environment 110 may include a wrapper generation module 112, a logging module 114, and a logging database 116. Other modules of the runtime environment 110 that are not depicted in FIG. 1B may include, but are not limited to, an execution module (e.g., the Java Virtual Machine (JVM) for the Java® programming language), a debugger, a log reader, and so on. In some examples, at least some of these modules may be included in an IDE (discussed above).

The wrapper generation module 112 may generate a runtime wrapper object or perform some other type of encapsulation of each object of the software system being executed to further facilitate automated logging for the wrapped object. The operation of the wrapper generation module 112 is described in greater detail below in conjunction with FIGS. 5 and 6. Also, the operation of the methods included in the wrapper object is discussed more fully below with respect to FIGS. 7 and 8.

Figure 2:
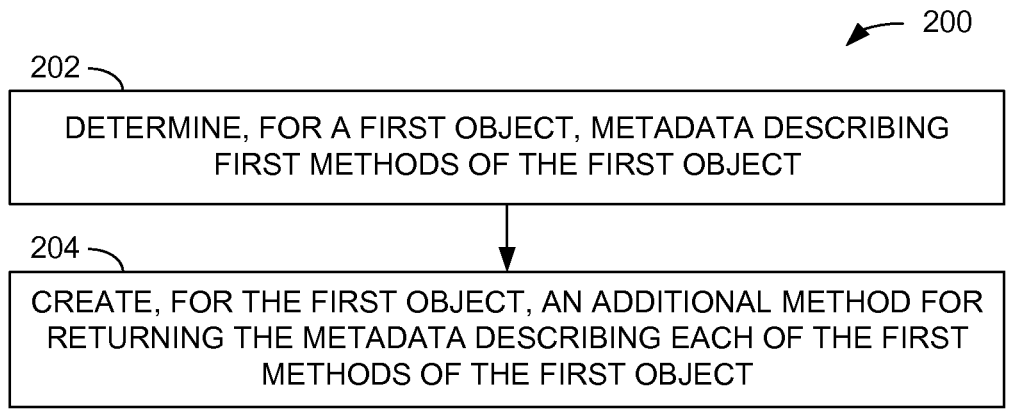
FIG. 2 is a flow diagram illustrating an example process in a design time environment to facilitate automated logging.

FIG. 2 is a flow diagram illustrating an example process 200 in a design time environment (e.g., the design time environment 100 of FIG. 1A) to facilitate automated logging. In one example, the metadata method generation module 102 may perform the process 200, although other modules may perform the process 200 in other embodiments. In the process 200, metadata describing the original or operational methods of a first object or class (termed herein "first methods") are determined (operation 202). In many embodiments, the source for this metadata for a first method of the first object may be the developer who developed that particular method, or possibly another developer charged specifically with providing the metadata. In one example, the developer or other individual may generate the metadata manually from personal knowledge of the first methods of the first object. In other implementations, the metadata of a first method may be generated or determined automatically based on input received from the developer during the creation of the first method. More specifically, the design time environment 100 may present a form or other input mechanism that formalizes the creation of the first methods of the first object. For example, such a form may present particular fields relating to the names of the first methods being created, the names and data types of parameters to be passed to the first methods, data types of return values provided by the first methods, textual descriptions of the parameters and return values, and so on. The design time environment 100 may then create or determine the metadata for each of the first methods of the first object based on the data entered in those fields. In another example, the metadata method generation module 102 of the design time environment 100 may parse the source code of the first methods to discover comments placed in the source code by the developer. The metadata method generation module 102 may then use at least some of those comments as the metadata to be returned. Other techniques by which the metadata may be determined or generated may also be employed.

In the process 200, an additional method configured to return the metadata describing each of the first methods of the first object may be created (operation 204). Similar to the determination of the metadata (operation 202) discussed above, the developer of a first method, or another individual, may create the additional method manually in some examples. In yet other implementations, the design time environment 100 may generate the additional method automatically, such as by accessing the first method name, associated parameters names and descriptions, and the like, and creating the additional method based on this information.

In some implementations, each of the operations 202 and 204 may be performed for the methods of each object of a software system, application, or program. In other examples, these operations 202 and 204 may be performed for only those objects for which logging is desired.

Figure 3:
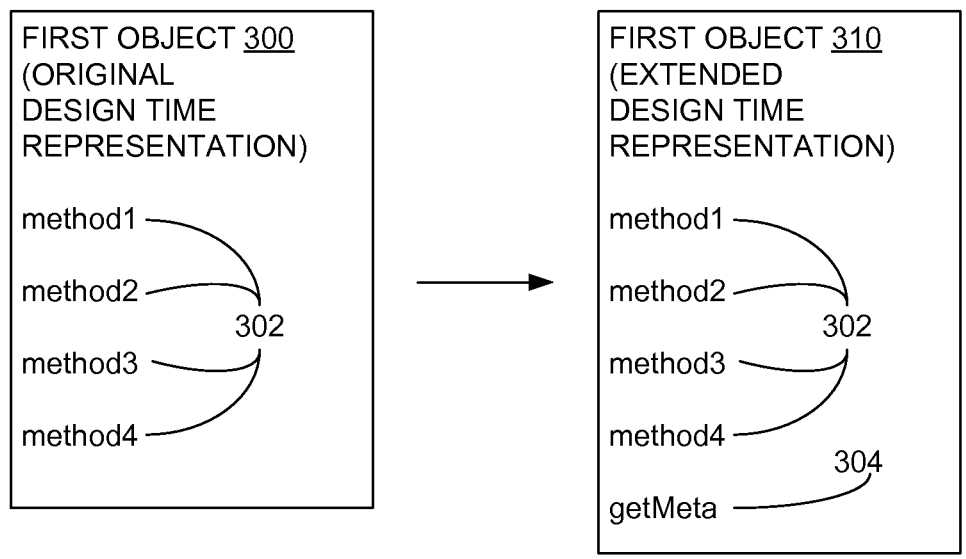
FIG. 3 is a graphical representation of an example object or class design time modification to include an additional method to retrieve metadata describing the other methods of the object or class.

FIG. 3 is a graphical representation of an example object or class design time modification to include an additional method to retrieve metadata describing the other methods of the object or class. More specifically, a first object 300 developed as part of a software system may include a set of original or first methods 302 (e.g., method1, method2, method3, and method4 of FIG. 3), as represented in an original design time representation of an object 300 or class. While FIG. 3 illustrates an object with four first or original methods, an object may include any number of first methods whose operations may be logged in other embodiments. Employing the process 200 of FIG. 2, the metadata method generation module 102 may extend the original design time representation of the first object 300 to produce an extended design time representation of the first object 310, which includes the same first methods 302, and an additional method 304 (named getMeta in FIG. 3). As indicated above, the additional method 304 getMeta, when called, returns metadata describing at least one of the first methods (e.g., method1, method2, method3, and method4.)

Figure 4:
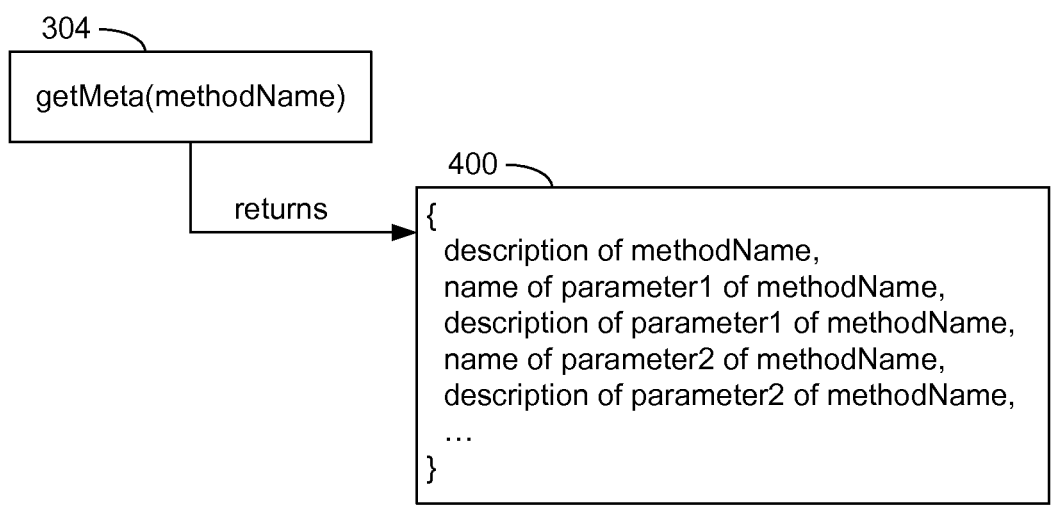
FIG. 4 is a graphical representation of example metadata returned from the additional method of FIG. 3.

FIG. 4 is a graphical representation of example metadata 400 returned from the additional method 304 getMeta of FIG. 3. In this particular example, getMeta receives a method name (methodName) of one of the first methods 302, such as, for example, method1, as a parameter. In response to being called, getMeta may then return the metadata pertaining specifically to the noted method (e.g., method1). In the example of FIG. 4, the metadata of interest may be returned as an array or list of items. These items may include, for example, a description of the method methodName, a name of each parameter (e.g., parameter1, parameter2, etc.) of the method methodName, a description of each parameter, a description of the return value of the method methodName, and so forth. In many implementations, the descriptions are in the form of character strings or other types of textual description. However, the additional method 304 may return other types of descriptive information, including numerical or graphical information, in other implementations. Further, other formats or data structures, as well as other types of descriptive information, that are used within the method methodName may be returned by way of the additional method 304 in other examples.

Figure 5:
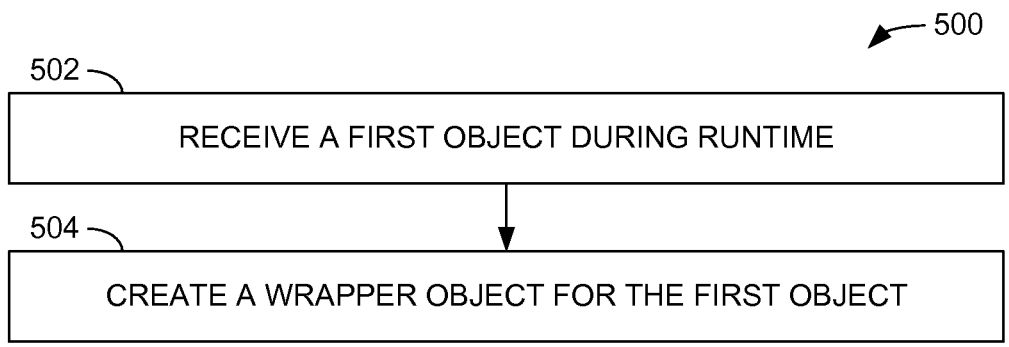
FIG. 5 is a flow diagram illustrating an example process in a runtime environment to facilitate automated logging.

After the generation of the extended design time representation of the first objects 310, these objects 310 may be provided to the runtime environment 110 of FIG. 1B. FIG. 5 is a flow diagram illustrating an example process 500 performed in the runtime environment 110 to facilitate automated logging. In the embodiments described herein, the wrapper generation module 112 may perform the creation of the wrapper object described below, which, in turn, performs the logging operations for the encapsulated first object explained hereinafter. In the process 500, a first object (e.g., extended first object 310 of FIG. 3) is received during runtime (operation 502). A wrapper object is then created for the first object (operation 504). In many implementations, a separate wrapper object is created for each object of the design time representation of the system, program, or application, when the object is instantiated. In those implementations, each of the first objects 310 being wrapped or encapsulated includes an additional method 304 to return metadata. In other examples, less than all of the first objects passed to the runtime environment 110 may include an additional method 304. In those examples, the runtime environment 110 may create wrapper objects for only those first objects that include an additional method 304.

Figure 6:
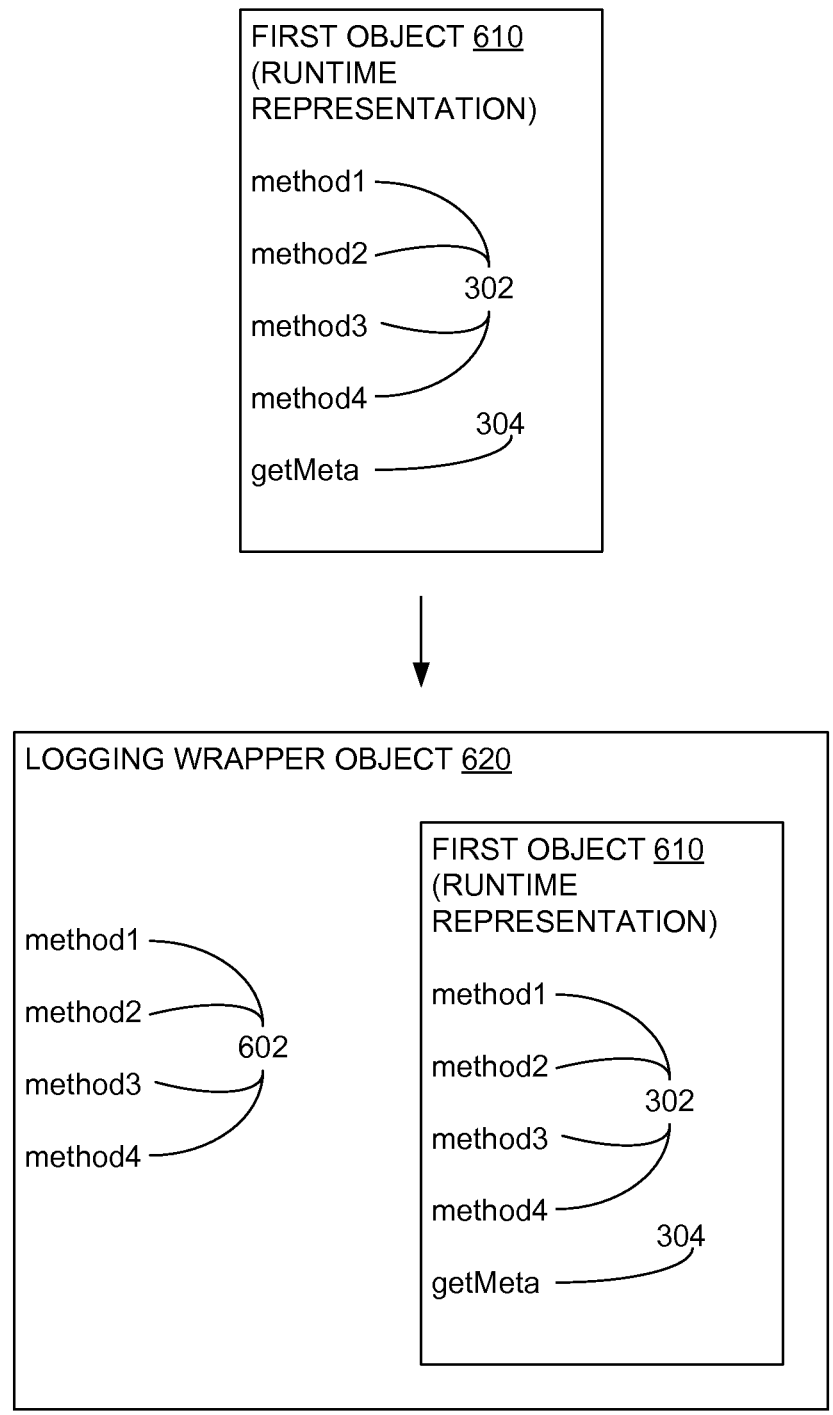
FIG. 6 is a graphical representation of an example runtime modification to encapsulate a modified runtime object with a wrapper object.

FIG. 6 is a graphical representation of an example object runtime modification to wrap or encapsulate a modified runtime object 610 with a logging wrapper object 620. In this specific example, the particular first object 610 to be wrapped is the runtime representation of the extended first object 310 of FIG. 3. In one example, the design time representation of an object may be the original source code of that object, while the runtime representation of the object may be in a more machine-executable form, such as, for example, a set of Java® byte codes.

As depicted in FIG. 6, the wrapper generation module 112 wraps or encapsulates the runtime representation of the first object 610 with a logging wrapper object 620 that includes a second method 602 for each of the first methods 302 of the wrapped first object 610. Each of the second methods 602 may provide an interface (e.g., number of parameters, names of parameters, parameter types, return value type, and so on) that is equivalent to the interface of the corresponding first method 302 of the first object 610. In the particular example of FIG. 6, the logging wrapper object 620 includes second methods 602, named method1, method2, method3, and method4 that correspond to the first methods 302 called method1, method2, method3, and method4, respectively. As a result of the logging wrapper object 620 encapsulating the first object 610, each of the second methods 602 is configured to be called as if each were its corresponding first method 302. In at least some embodiments, a second method 602 is not generated for the additional method 304 (getMeta) of the first object 610, as only the second methods 602 corresponding to the first methods 302 are configured to access or call the additional method 304.

In various embodiments, the logging wrapper object 620 may be written or configured to wrap the first object 610 according to a number of design patterns or paradigms. For example, the logging wrapper object 620 may encapsulate the first object 610 according to a delegation design pattern or a decoration design pattern. In some implementations, the runtime environment 110 may employ one or more runtime-based switches that allow a user to determine during runtime whether logging is employed. Such switches may determine whether the logging wrapper object 620 performs logging or merely passes calls and return values between a caller and the methods of the first object 610. In other examples, the switches may determine whether any or particular ones of the logging wrapper objects 620 are to be generated when a first object 610 is instantiated.

Figure 7:
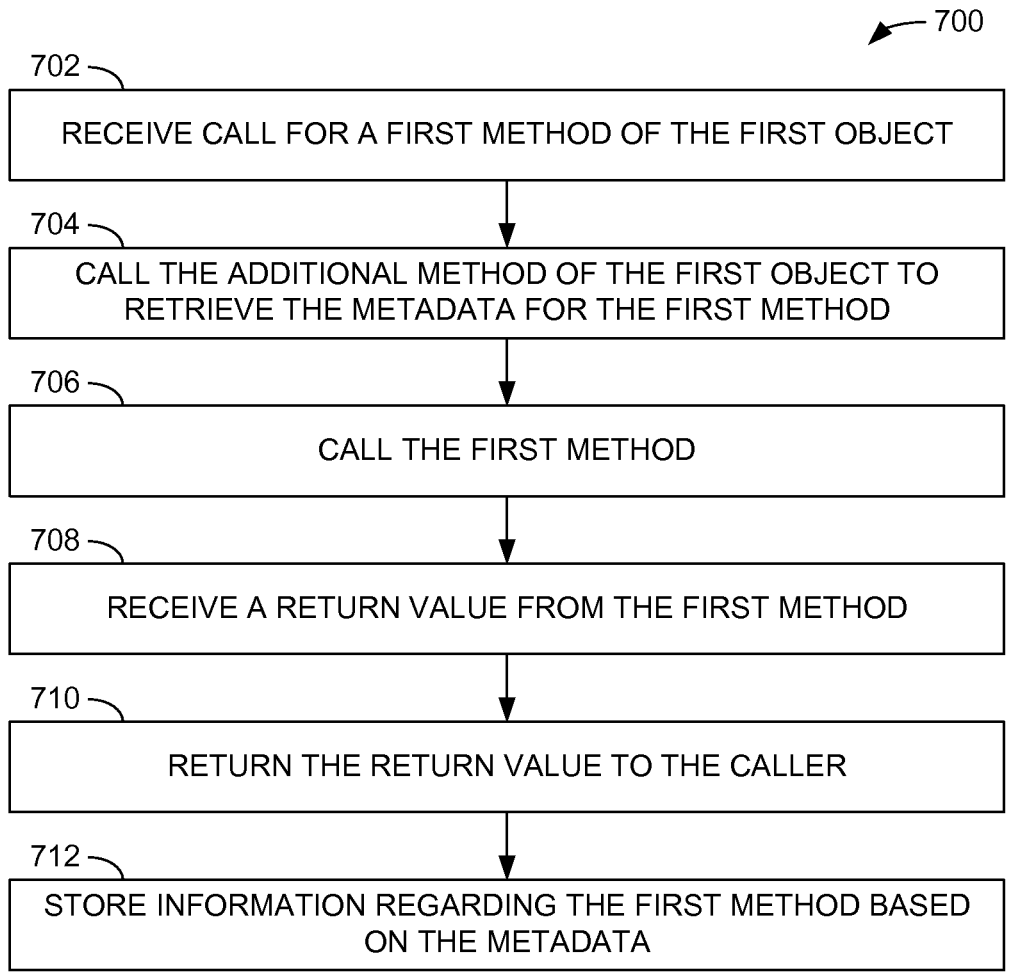
FIG. 7 is a flow diagram of an example process performed by a method of an example wrapper object to provide automated logging.

FIG. 7 is a flow diagram of an example process 700 performed by a second method 602 of the logging wrapper object 620 to provide automated logging. In the process 700, a method call may be received at the logging wrapper object 620 for a first method 302 (e.g., method1) of the first object 610 (operation 702). As a result of the encapsulation of the first object 610, the corresponding second method 602 (e.g., method1) is actually called. In response, the corresponding second method 602 may call the additional method 304 (e.g., getMeta) of the first object 610 to retrieve metadata for the first method 302 (e.g., the metadata for method1) (operation 704). The corresponding second method 602 may also call the first method 302 (e.g., method1) (operation 706). After the call to the first method 302, the corresponding second method 602 may receive a return value from the first method 302 (operation 708), which the corresponding second method 602 may then return to its caller (operation 710). The corresponding second method 602, by way of the logging module 114, may store information to, for example, the logging database 116, regarding the first method 304 based on the retrieved metadata (operation 712). As discussed in greater detail below, some of this information may be stored prior to the call to the first method 302 (operation 706), and some of the information may be stored after the return value is received from the first method 302 (operation 708). Also, as discussed in a particular example below, timing information regarding the first method 302 (e.g., when called, when returning a value, and so forth) may also be included in the stored information.

Thus, by employing the process 700, from the perspective of the caller of the corresponding second method 602, the first method 302 is being called directly, while the corresponding second method 602 is intercepting the call and passing the call on to the first method 302 while logging information concerning the operation of the first method 302, thus facilitating logging in a hidden and automated manner.

Figure 8:
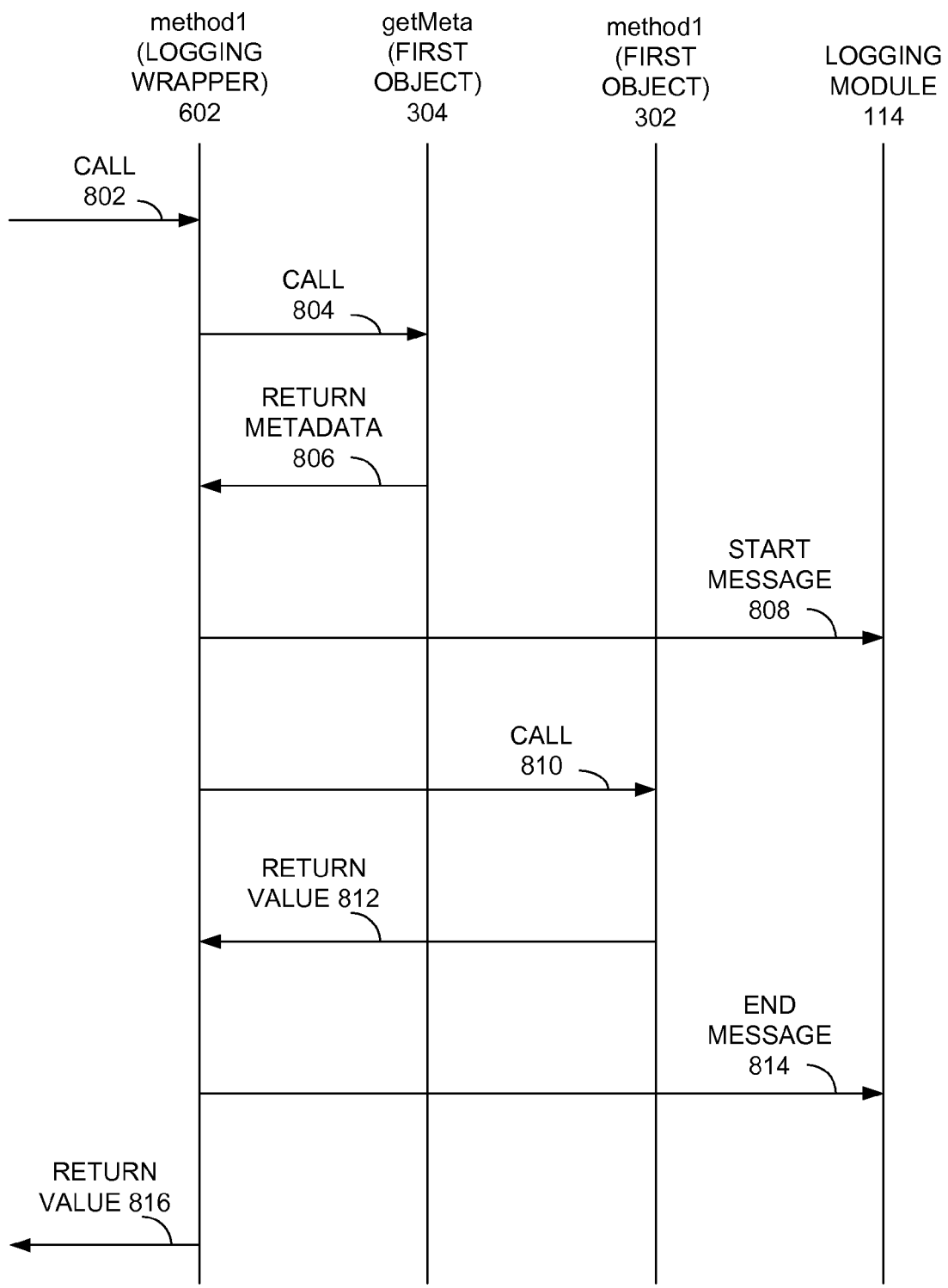
FIG. 8 is a communication diagram of example communications involving a wrapper object method to perform automated logging.

FIG. 8 is a communication diagram of example communications involving a process performed by a second method 602 of a logging wrapper object 620 to perform logging. As shown, in response to receiving a call 802, the second method 602 method1 of the logging wrapper object 620 may call 804 the additional method getMeta 304 of the first object 610 by passing a parameter indicating the first method 302 method1 corresponding to the second method 602 method1. In return to the call 804, the additional method 304 getMeta may then return the metadata 806 describing the first method 302 method1.

The second method 602 method1 may then send a start message 808 to the logging database 116 via the logging module 114 to indicate that the operation of the first method 302 method1 is to begin. In one example, the start message 808 may include information such as, for example, the name and/or description of the first method 302 method1; the names, descriptions, and/or values of the parameters being passed to the first method 302 method1; and possibly a current time value. In one example, the second method 602 method1 may call a utility provided by the runtime environment 110 that returns the current time, and then include that time in the start message 808 that contains the information to be stored in the logging database 116. In another example, the logging module 114, upon receiving the start message 808, may obtain the current time by way of the runtime environment 110 and store the time in the logging database 116 along with the information received in the start message 808.

The second method 602 method1 may then call 810 the first method 302 method1 using the parameters that were received from the caller of the second method 602 method1. Upon completing execution, the first method 302 method1 may then return a return value 812 to the second method 602 method1. In response to receiving the return value 812, the second method 602 method1 may then issue or transmit an end message 814 to the logging module 114, providing the return value 812, an indication of whether the return value 812 denotes a successful or unsuccessful completion of the first method 302 method1, and possibly a description of the return value provided by the metadata 806 previously returned by getMeta. As with the start message 808, the second method 602 method1 may also obtain and provide a current time associated with the execution completion of the first method 302 method1, or the logging module 114 may obtain and include the current time in the information to be stored in the logging database 116. The second method 602 method1 may then return that same return value 816 to the caller of the second method 602 method1.

While the communications 802 through 816 of FIG. 8 are shown in a specific order, other orders of communication may be possible in some implementations of FIG. 8, as well as other processes discussed herein. For example, the start message 808 and the end message 814 may both be transmitted from the second method 602 method1 to the logging module 114 after the return value 812 has been received at the second method 602 method1, thus reducing the number of messages sent to the logging module 114 by approximately half.

Figure 9:
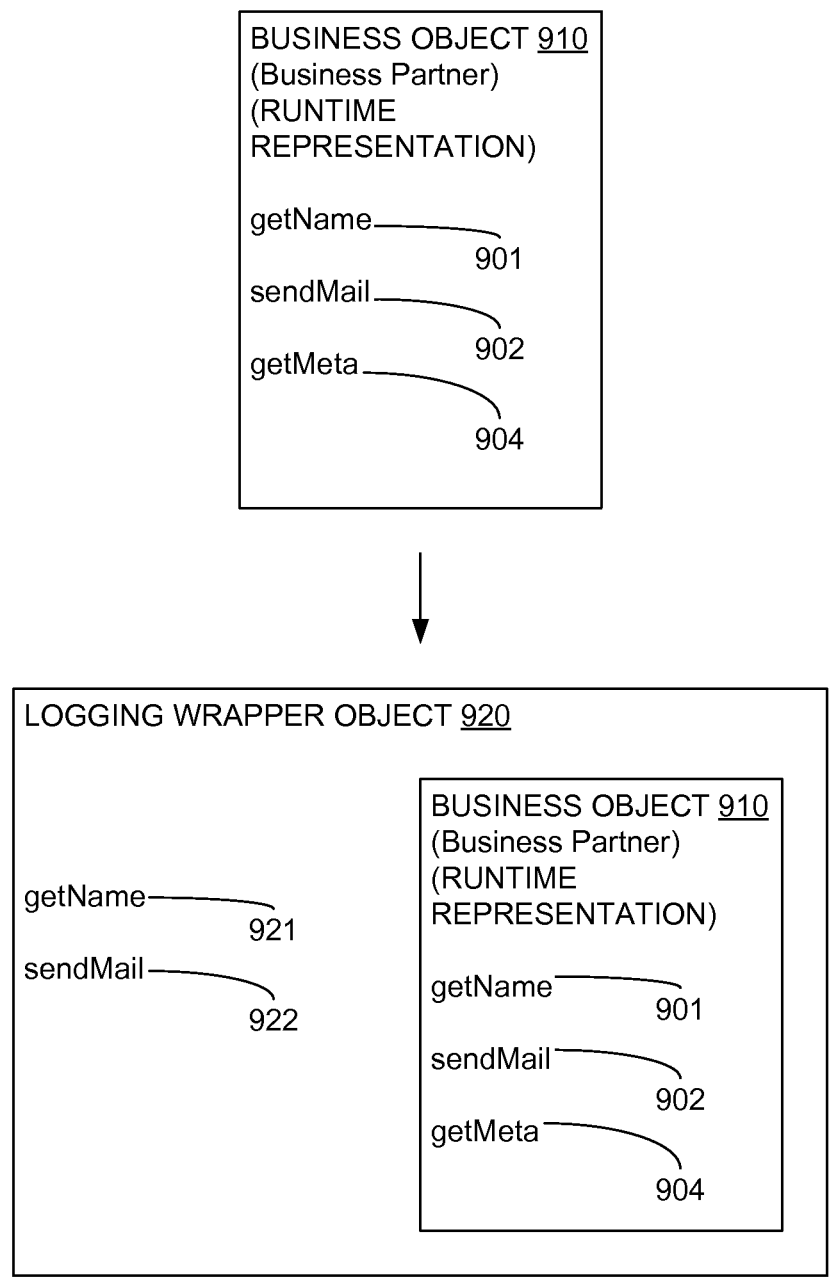
FIG. 9 is a graphical representation of a runtime representation of an example business object that is encapsulated within a corresponding logging wrapper object for logging purposes.

FIG. 9 is a graphical representation of a runtime representation of an example business object 910 (called "Business Partner") that has been encapsulated within a corresponding logging wrapper object 920 for logging purposes. Included in the business object 910 are two original or first methods, termed getName 901 and sendMail 902. In this example, the getName method 901, when called, may return the name of a business partner corresponding to the business object 910. The sendMail object 902, when called, receives text as input to be transmitted in a mail message to the partner. Also included in the business object 910 is an additional method 904 getMeta, which is generated at design time and is configured to receive a name of one of the first methods 901 and 902 and to return metadata describing that particular first method 901 and 902, as discussed in greater detail above.

During runtime, the wrapper generation module 112 may create a logging wrapper object 920 to encapsulate the business object 910. The logging wrapper object 920 may thus include a second method 921 getName and another second method 922 sendMail that call their corresponding first methods 901, 902, as well as the additional method 904 getMeta, in a manner similar to that described above.

In an example, presuming a call to the sendMail method has been made, the second method 922 sendMail of the logging wrapper object 920 may respond to the call, accepting the parameters that are intended for the first method 902 sendMail of the business object 910. The second method 922 sendMail may then call the additional method 904 getMeta, possibly using as a parameter the name of second method 902 of interest (sendMail). In response, the additional method 904 getMeta, which only defines a single parameter in this example, may return a description of the method, the name of the parameter, and a description of the parameter. For example, the additional method 904 getMeta may return {method_description='Send mail to business partner', parameter_name_1='mailText', parameter_description_1='Text of the mail'}.

Using this metadata from the additional method 904 getMeta, the second method 922 sendMail may then create a first log message to be provided to the logging module 114 for storage in the logging database 116 that indicates the conditions under which the first method 902 sendMail is to be called. An example of such a message may include a current time, a description of the first method 902 sendMail, and a description and value of the parameter:

'2013-08-09/10:23:10 GMT: Send mail to business partner—Text of mail: <text>'

After the first log message is sent, the second method 922 sendMail may then call the corresponding first method 902 sendMail using the parameter received at the second method 922 sendMail. Presuming the first method 902 sendMail completed its operations successfully, thus returning a return value that indicates a successful mail transmission, the second method 922 sendMail may then create a second log message to be provided to the logging module 114 for storage in the logging database 116 that indicates the successful completion of the first method sendMail 902:

'2013-08-09/10:23:35 GMT: Send mail to business partner—successful'

If, instead, the first method 902 sendMail encounters an error condition, the first method 902 sendMail may return an error condition, thus causing the second method 922 sendMail to create and transmit a second log message for the logging database 116 that indicates that error condition:

'2013-08-09/10:23:35 GMT: Send mail to business partner—failure'

As a result, two log messages—one prior to calling the first method 902 sendMail, and one after the first method 902 sendMail completes—would be generated for each execution of the first method 902 sendMail of the business object 910. After the second log message is sent to the logging module 114, the second method 922 sendMail may the return the value returned from the first method 902 sendMail to the original caller.

As a result of at least some of the embodiments described above, a logging system may be created in which the first, original methods of an object or class need not be modified or enhanced directly to enable or support logging. At most, the developer of the original methods would only generate a single additional method for each object that simply returns names and descriptions of the methods, parameters used, and the like, as metadata, most likely in natural language. Further, some or all aspects of generating the additional method may be automated in a design time environment. The subsequent task of generating a wrapper object may be automated in the runtime environment. Accordingly, the developers may concentrate more fully on the primary methods being generated, and the cost and effort redundancies often associated with providing logging functionality may be reduced considerably.

Figure 10:
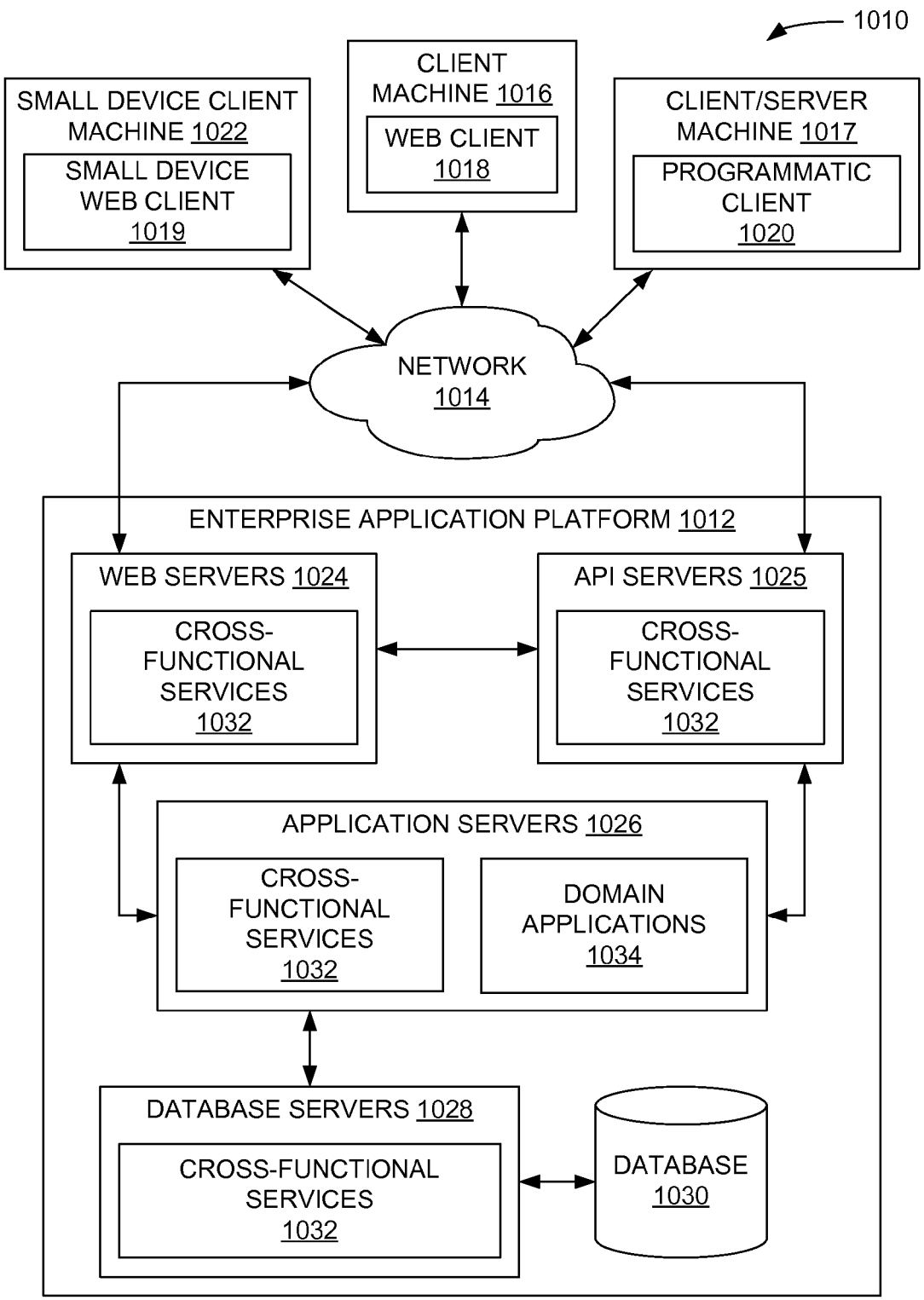
FIG. 10 is a block diagram of an example system having a client-server architecture for an enterprise application platform capable of employing the systems and methods described herein.

FIG. 10 is a network diagram depicting an example system 1010, according to one exemplary embodiment, having a client-server architecture configured to perform the various methods described herein. A platform (e.g., machines and software), in the exemplary form of an enterprise application platform 1012, provides server-side functionality via a network 1014 (e.g., the Internet) to one or more clients. FIG. 10 illustrates, for example, a client machine 1016 with a web client 1018 (e.g., a browser, such as the Internet Explorer® browser developed by Microsoft® Corporation), a small device client machine 1022 with a small device web client 1019 (e.g., a browser without a script engine), and a client/server machine 1017 with a programmatic client 1020.

Turning specifically to the enterprise application platform 1012, web servers 1024 and application program interface (API) servers 1025 are coupled to, and provide web and programmatic interfaces to, application servers 1026. The application servers 1026 are, in turn, shown to be coupled to one or more database servers 1028, which may facilitate access to one or more databases 1030. The web servers 1024, API servers 1025, application servers 1026, and database servers 1028 may host cross-functional services 1032. The application servers 1026 may further host domain applications 1034.

The cross-functional services 1032 may provide user services and processes that utilize the enterprise application platform 1012. For example, the cross-functional services 1032 may provide portal services (e.g., web services), database services, and connectivity to the domain applications 1034 for users that operate the client machine 1016, the client/server machine 1017, and the small device client machine 1022. In addition, the cross-functional services 1032 may provide an environment for delivering enhancements to existing applications and for integrating third-party and legacy applications with existing cross-functional services 1032 and domain applications 1034. Further, while the system 1010 shown in FIG. 10 employs a client-server architecture, the present disclosure is, of course, not limited to such an architecture, and could equally well find application in a distributed or peer-to-peer architecture system.

Figure 11:
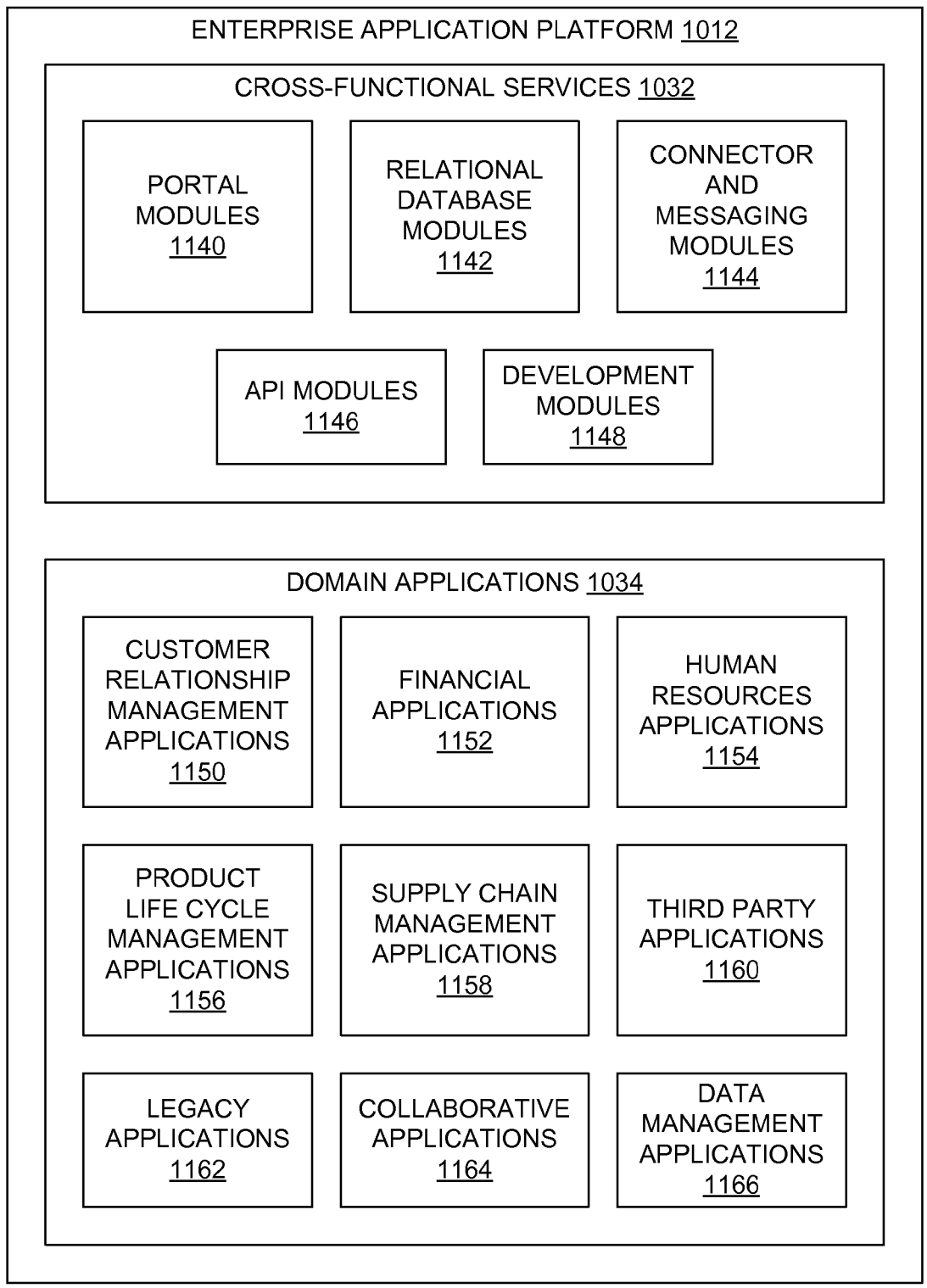
FIG. 11 is a block diagram of example applications and modules employable in the enterprise application platform of FIG. 10.

FIG. 11 is a block diagram illustrating example enterprise applications and services, such as those described herein, as embodied in the enterprise application platform 1012, according to an exemplary embodiment. The enterprise application platform 1012 includes cross-functional services 1032 and domain applications 1034. The cross-functional services 1032 include portal modules 1140, relational database modules 1142, connector and messaging modules 1144, API modules 1146, and development modules 1148.

The portal modules 1140 may enable a single point of access to other cross-functional services 1032 and domain applications 1034 for the client machine 1016, the small device client machine 1022, and the client/server machine 1017 of FIG. 10. The portal modules 1140 may be utilized to process, author, and maintain web pages that present content (e.g., user interface elements and navigational controls) to the user. In addition, the portal modules 1140 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 1140 may include, in one implementation, a generation module, a communication module, a receiving module, and a regeneration module. In addition, the portal modules 1140 may comply with web services standards and/or utilize a variety of Internet technologies, including, but not limited to, Java®, Java 2 Platform-Enterprise Edition (J2EE), SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft .NET.

The relational database modules 1142 may provide support services that include a user interface library for access to the database 1030 (FIG. 10). The relational database modules 1142 may provide support for object relational mapping, database independence, and distributed computing. The relational database modules 1142 may be utilized to add, delete, update, and manage database elements. In addition, the relational database modules 1142 may comply with database standards and/or utilize a variety of database technologies including, but not limited to, Structured Query Language (SQL), SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 1144 may enable communication across different types of messaging systems that are utilized by the cross-functional services 1032 and the domain applications 1034 by providing a common messaging application processing interface. The connector and messaging modules 1144 may enable asynchronous communication on the enterprise application platform 1012.

The API modules 1146 may enable the development of service-based applications by exposing an interface to existing and new applications as services. Repositories may be included in the platform 1012 as a central place to find available services when building applications.

The development modules 1148 may provide a development environment for the adding, integrating, updating, and extending of software components on the enterprise application platform 1012 without impacting existing cross-functional services 1032 and domain applications 1034.

Turning to the domain applications 1034, customer relationship management applications 1150 may enable access to, and facilitate collecting and storing of, relevant personalized information from multiple data sources and business processes. Enterprise personnel who are tasked with developing a buyer into a long-term customer may utilize the customer relationship management applications 1150 to provide assistance to the buyer throughout a customer engagement cycle.

Enterprise personnel may utilize financial applications 1152 and business processes to track and control financial transactions within the enterprise application platform 1012. The financial applications 1152 may facilitate the execution of operational, analytical, and collaborative tasks that are associated with financial management. Specifically, the financial applications 1152 may enable the performance of tasks related to financial accountability, planning, forecasting, and managing the cost of finance.

Human resources applications 1154 may be utilized by enterprise personnel and business processes to manage, deploy, and track enterprise personnel. Specifically, the human resources applications 1154 may enable the analysis of human resource issues and facilitate human resource decisions based on real-time information.

Product life cycle management applications 1156 may enable the management of a product throughout the lifecycle of the product. For example, the product life cycle management applications 1156 may enable collaborative engineering, custom product development, project management, asset management, and quality management among business partners.

Supply chain management applications 1158 may enable monitoring of performances that are observed in supply chains. The supply chain management applications 1158 may facilitate adherence to production plans and on-time delivery of products and services.

Third-party applications 1160, as well as legacy applications 1162, may be integrated with domain applications 1034 and utilize cross-functional services 1032 on the enterprise application platform 1012.

Additionally, collaborative applications 1164 may facilitate joint creation and modification of documents and other work product by multiple users, and data management applications 1166 may enable data organization and other management functions to be performed on data generated by one or more other domain applications 1034.

Figure 12:
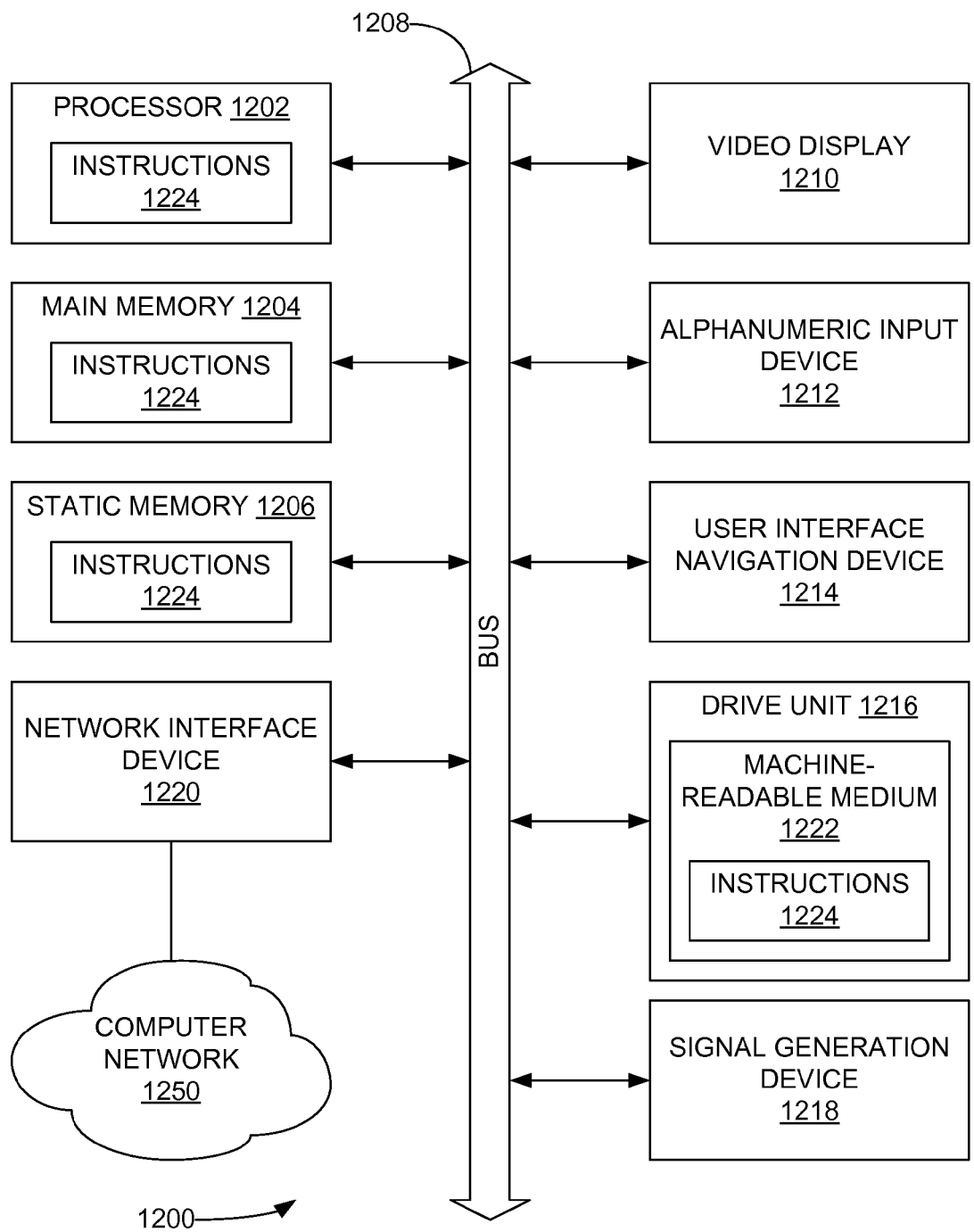
FIG. 12 is a block diagram of a machine in the example form of a processing system within which may be executed a set of instructions for causing the machine to perform any one or more of the methodologies discussed herein.

FIG. 12 depicts a block diagram of a machine in the example form of a processing system 1200 within which may be executed a set of instructions 1224 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 1224 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1200 includes a processor 1202 (e.g., a central processing unit (CPU), a graphics processing unit (GPU), or both), a main memory 1204 (e.g., random access memory), and static memory 1206

(e.g., static random-access memory), which communicate with each other via bus 1208. The processing system 1200 may further include video display unit 1210 (e.g., a plasma display, a liquid crystal display (LCD), or a cathode ray tube (CRT)). The processing system 1200 also includes an alphanumeric input device 1212 (e.g., a keyboard), a user interface (UI) navigation device 1214 (e.g., a mouse), a disk drive unit 1216, a signal generation device 1218 (e.g., a speaker), and a network interface device 1220.

The disk drive unit 1216 (a type of non-volatile memory storage) includes a machine-readable medium 1222 on which is stored one or more sets of data structures and instructions 1224 (e.g., software) embodying or utilized by any one or more of the methodologies or functions described herein. The data structures and instructions 1224 may also reside, completely or at least partially, within the main memory 1204, the static memory 1206, and/or within the processor 1202 during execution thereof by processing system 1200, with the main memory 1204, the static memory 1206, and the processor 1202 also constituting machine-readable, tangible media.

The data structures and instructions 1224 may further be transmitted or received over a computer network 1250 via network interface device 1220 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1200) or one or more hardware modules of a computer system (e.g., a processor 1202 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1202 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1202 that is configured using software, the general-purpose processor 1202 may be configured as respective different hardware modules at different times. Software may accordingly configure the processor 1202, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1202 or processor-implemented modules. The performance of certain of the operations may be distributed among the one or more processors 1202, not only residing within a single machine but deployed across a number of machines. In some example embodiments, the processors 1202 may be located in a single location (e.g., within a home environment, within an office environment, or as a server farm), while in other embodiments, the processors 1202 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of logging information in an object-oriented system, the method comprising:
receiving a first object comprising a plurality of first methods, wherein the first object further comprises an additional method configured to receive an identity of one of the first methods and to return metadata corresponding to the one of the first methods; and
creating, using at least one processor of a machine, a wrapper object for the first object, wherein the wrapper object comprises a plurality of second methods, wherein each of the second methods comprises an interface that is equivalent to an interface of a corresponding one of the first methods, and wherein each of the second methods is configured to:
call the additional method of the first object to retrieve the metadata for the corresponding one of the first methods;
call the corresponding one of the first methods;
receive a return value from the corresponding one of the first methods;
return the return value; and
store information regarding the corresponding one of the first methods based on the retrieved metadata.

2. The method of claim 1, wherein:
the retrieved metadata for the corresponding one of the first methods comprise a description of the corresponding one of the first methods.

3. The method of claim 1, wherein:
the retrieved metadata for the corresponding one of the first methods comprise a description of at least one of a parameter for the corresponding one of the first methods and the return value for the corresponding one of the first methods.

4. The method of claim 1, wherein:
the storing of the information regarding the corresponding one of the first methods comprises storing a parameter received from a caller of the second method; and
the calling of the corresponding one of the first methods comprises passing the parameter received from the caller of the second method to the corresponding one of the first methods.

5. The method of claim 4, wherein:
the calling of the corresponding one of the first methods occurs after the storing of the parameter received from the caller of the second method.

6. The method of claim 1, wherein the storing of information regarding the corresponding one of the first methods comprises storing the return value received from the corresponding one of the first methods.

7. The method of claim 1, wherein the storing of information regarding the corresponding one of the first methods comprises storing an indication of whether an error occurred during execution of the corresponding one of the first methods.

8. The method of claim 1, wherein the storing of information regarding the corresponding one of the first methods comprises storing a current time.

9. The method of claim 1, wherein the call to the corresponding one of the first methods is performed using one of a delegate pattern and a decorator pattern.

10. The method of claim 1, wherein the receiving of the first object and the creating of the wrapper object are performed at runtime.

11. The method of claim 1, further comprising:
receiving user input describing the interface of each of the plurality of first methods; and
generating the additional method based on the user input.

12. The method of claim 1, wherein the user input is provided during creation of the first object at design time.

13. A non-transitory computer-readable storage medium comprising instructions that, when executed by at least one processor of a computing system, cause the computing system to perform operations comprising:
receiving a first object comprising a plurality of first methods, wherein the first object further comprises an additional method configured to receive an identity of one of the first methods and to return metadata corresponding to the one of the first methods; and
creating a wrapper object for the first object, wherein the wrapper object comprises a plurality of second methods, wherein each of the second methods comprises an interface that is equivalent to an interface of a corresponding one of the first methods, and wherein each of the second methods is configured to:
call the additional method of the first object to retrieve the metadata for the corresponding one of the first methods;
call the corresponding one of the first methods;
receive a return value from the corresponding one of the first methods;
return the return value; and
store information regarding the corresponding one of the first methods based on the retrieved metadata.

14. A computing system comprising:
at least one processor; and
modules comprising instructions to be executed by the at least one processor, the modules comprising:
a logging module configured to receive and store information regarding execution of a plurality of first methods of a first object; and
a wrapper generation module configured to create a wrapper object for the first object, wherein the wrapper object comprises a plurality of second methods, wherein each of the second methods comprises an interface that is equivalent to an interface of a corresponding one of the first methods, and wherein each of the second methods is configured to:
call an additional method of the first object to retrieve metadata for the corresponding one of the first methods;
call the corresponding one of the first methods;
receive a return value from the corresponding one of the first methods;
return the return value; and
store, using the logging module, information regarding the corresponding one of the first methods based on the retrieved metadata.

15. A method of logging information in an object-oriented program, the method comprising:
receiving, at a wrapper object for a first object, a call for one of a plurality of first methods of the first object, wherein the call comprises at least one parameter for the one of the first methods;
calling, from the wrapper object, an additional method of the first object to retrieve metadata for the one of the first methods;
calling, from the wrapper object, the one of the first methods using the at least one parameter;
receiving, from the one of the first methods, a return value;

returning, from the wrapper object, the return value received from the one of the first methods; and storing, from the wrapper object, using at least one processor of a machine, information describing the at least one parameter and the return value received from the one of the first methods based on the metadata for the one of the first methods.

16. The method of claim 15, wherein the calling of the additional method of the first object comprises providing a parameter to the additional method identifying the one of the first methods.

17. The method of claim 15, wherein the metadata for the one of the first methods comprises, for each parameter of the one of the first methods, at least one of a name of the parameter and a textual description of the parameter.

18. The method of claim 15, wherein the metadata for the one of the first methods comprises a textual description of the one of the first methods.

19. The method of claim 15, wherein the storing of the information describing the at least one parameter and the return value comprises storing, for each parameter, a name of the parameter and a value of the parameter.

20. The method of claim 15, wherein the storing of the information describing the at least one parameter and the return value comprises:

storing, with the information describing the at least one parameter, a first current time prior to the calling of the one of the first methods; and storing, with the information describing the return value, a second current time after the return value is returned from the one of the first methods.

* * * * *